US011235481B2

(12) United States Patent
Murakami et al.

(10) Patent No.: US 11,235,481 B2
(45) Date of Patent: Feb. 1, 2022

(54) OSCILLATORY LINEAR ACTUATOR AND CUTTING DEVICE

(71) Applicant: PANASONIC INTELLECTUAL PROPERTY MANAGEMENT CO., LTD., Osaka (JP)

(72) Inventors: Tomoaki Murakami, Osaka (JP); Noboru Kobayashi, Osaka (JP); Hiroki Inoue, Shiga (JP); Masashi Moriguchi, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/950,837

(22) Filed: Apr. 11, 2018

(65) Prior Publication Data

US 2018/0304481 A1   Oct. 25, 2018

(30) Foreign Application Priority Data

Apr. 19, 2017   (JP) .............................. JP2017-082980

(51) Int. Cl.
| | |
|---|---|
| *B26B 19/28* | (2006.01) |
| *H02K 33/16* | (2006.01) |
| *H02K 33/06* | (2006.01) |
| *H02K 7/04* | (2006.01) |

(Continued)

(52) U.S. Cl.
CPC .......... *B26B 19/282* (2013.01); *B26B 19/288* (2013.01); *H02K 33/06* (2013.01); *H02K 33/16* (2013.01); *H02K 7/00* (2013.01); *H02K 7/04* (2013.01); *H02K 16/02* (2013.01)

(58) Field of Classification Search
CPC ....... B26B 19/02; B26B 19/28; B26B 19/282; H02K 33/06
See application file for complete search history.

(56) References Cited

U.S. PATENT DOCUMENTS 5,632,087 A * 5/1997 Motohashi ............ B26B 19/282
30/43.9
5,678,312 A   10/1997 Watanabe
(Continued)

FOREIGN PATENT DOCUMENTS

| EP | 1 193 844 A1 | 4/2002 |
| EP | 1 329 203 A1 | 7/2003 |

(Continued)

OTHER PUBLICATIONS

Extended European Search Report issued in European Application No. 18166438.4 dated Jul. 9, 2018.

(Continued)

*Primary Examiner* — Jennifer S Matthews
(74) *Attorney, Agent, or Firm* — McDermott Will and Emery LLP

(57) ABSTRACT

An oscillatory linear actuator includes: an output movable element which is reciprocated by a periodically varying magnetic field and performs work on an object; and a vibration absorbing movable element which is reciprocated at a phase opposite to a phase of the output movable element and reduces vibration of the oscillatory linear actuator. The vibration absorbing movable element is lighter in weight than the output movable element.

5 Claims, 7 Drawing Sheets

(51) Int. Cl.
*H02K 16/02* (2006.01)
*H02K 7/00* (2006.01)

(56) References Cited

U.S. PATENT DOCUMENTS

| | | | | |
|---|---|---|---|---|
| 6,559,563 | B1* | 5/2003 | Shimizu | H02K 33/10 30/43.92 |
| 6,991,217 | B2* | 1/2006 | Shimizu | B26B 19/282 251/284 |
| 7,015,602 | B2* | 3/2006 | Kraus | B26B 19/282 310/36 |
| 7,053,507 | B2* | 5/2006 | Kobayashi | B26B 19/282 310/15 |
| 7,328,474 | B2* | 2/2008 | Nishinaka | A61C 17/3445 15/22.1 |
| 7,504,751 | B2* | 3/2009 | Kraus | B26B 19/282 310/12.04 |
| 8,806,756 | B2* | 8/2014 | Kraus | B26B 19/288 30/43.3 |
| 2002/0195884 | A1 | 12/2002 | Ichii et al. | |
| 2003/0145469 | A1* | 8/2003 | Ogawa | B26B 19/02 30/210 |
| 2004/0010871 | A1 | 1/2004 | Nishinaka et al. | |
| 2005/0134123 | A1* | 6/2005 | Kobayashi | B26B 19/282 310/36 |
| 2005/0212365 | A1* | 9/2005 | Kraus | B26B 19/288 310/36 |
| 2005/0212633 | A1* | 9/2005 | Kraus | B26B 19/288 335/229 |

FOREIGN PATENT DOCUMENTS

| | | |
|---|---|---|
| EP | 2790309 A1 | 10/2014 |
| JP | 2005-185067 A | 7/2005 |

OTHER PUBLICATIONS

Communication pursuant to Article 94(3) EPC dated May 14, 2019 issued for the corresponding European Patent Application No. 18166438.4.

* cited by examiner

OSCILLATORY LINEAR ACTUATOR AND CUTTING DEVICE

CROSS REFERENCE TO RELATED APPLICATION

This application claims the benefit of priority of Japanese Patent Application Number 2017-082980 filed on Apr. 19, 2017, the entire content of which is hereby incorporated by reference.

BACKGROUND

1. Technical Field

The present disclosure relates to an oscillatory linear actuator which is reciprocated along an axis and a cutting device which includes the oscillatory linear actuator and cuts an object such as body hair and grass.

2. Description of the Related Art

In an oscillatory linear actuator which is reciprocated along an axis, in particular, a device held by a human hand, two types of movable elements which have approximately the same weight and which are driven at mutually opposite phases may be disposed parallel to each other in order to reduce vibration to be transmitted to the hand. Moreover, Japanese Unexamined Patent Application Publication No. 2005-185067 discloses a configuration in which those two types of movable elements are connected to each other, and a movable blade for cutting an object, such as body hair, is attached to only one of the movable elements.

SUMMARY

However, in the oscillatory linear actuator as described above, although only one of the movable elements performs work on the object, the movable elements both with the same weight are oscillated at opposite phases in order to reduce vibration. This results in wasteful energy consumption.

The present disclosure has been conceived to solve such a conventional problem. An object of the present disclosure is to provide an oscillatory linear actuator which is capable of achieving powerful drive by concentrating the thrust force of the oscillatory linear actuator on the output movable element which performs work on the object, at the same time as reducing vibration, and a cutting device which includes the oscillatory linear actuator.

In order to achieve the object, an oscillatory linear actuator according to one aspect of the present disclosure includes: an output movable element which is reciprocated by a periodically varying magnetic field and performs work on an object; and a vibration absorbing movable element which is reciprocated at a phase opposite to a phase of the output movable element and reduces vibration of the oscillatory linear actuator. The vibration absorbing movable element is lighter in weight than the output movable element.

With this, the thrust force of the oscillatory linear actuator is not greatly reduced due to driving of the vibration absorbing movable element which does not perform work on the object. Hence, energy can be efficiently used.

As a result, the oscillatory linear actuator is capable of efficiently using energy, and also capable of improving the thrust force, leading to powerful driving of the oscillatory linear actuator.

Moreover, it may be that the vibration absorbing movable element includes a weight for weight adjustment.

With this, weight adjustment of the output movable element and the vibration absorbing movable element can be easily performed.

Moreover, it may be that the output movable element includes a permanent magnet, and the vibration absorbing movable element includes a permanent magnet, and the permanent magnets of the output movable element and the vibration absorbing movable element are reciprocated by a single fixed electromagnet.

Moreover, a cutting device according to another aspect of the present disclosure includes: the oscillatory linear actuator; a movable blade included in the output movable element; and a stationary blade which rubs against the movable blade.

According to the present disclosure, the thrust force of the oscillatory liner actuator is not used greatly for the vibration absorbing movable body, thereby improving the thrust force to be output.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

Next, an embodiment of an oscillatory linear actuator and a cutting device including the oscillatory linear actuator according to the present disclosure will be described with reference to the drawings. Note that the following embodiment merely illustrates an example of the oscillatory linear actuator and the cutting device including the oscillatory linear actuator according to the present disclosure. As such, the scope of the present disclosure is demarcated by the scope of the language in the claims using the below embodiment as a reference, and is not intended to be limited merely by the following embodiment. Therefore, among the structural elements in the following embodiment, structural elements not recited in any one of the independent claims defining the most generic part of the inventive concept are described as preferred structural elements, and are not absolutely necessary to achieve the object according to the present disclosure.

Note that the drawings are schematic illustrations in which emphasis, omission, and adjustment in proportion are made as appropriate to illustrate the present disclosure, and may differ from the actual shape, positional relationship, and proportion.

[Cutting Device]

Figure 1:
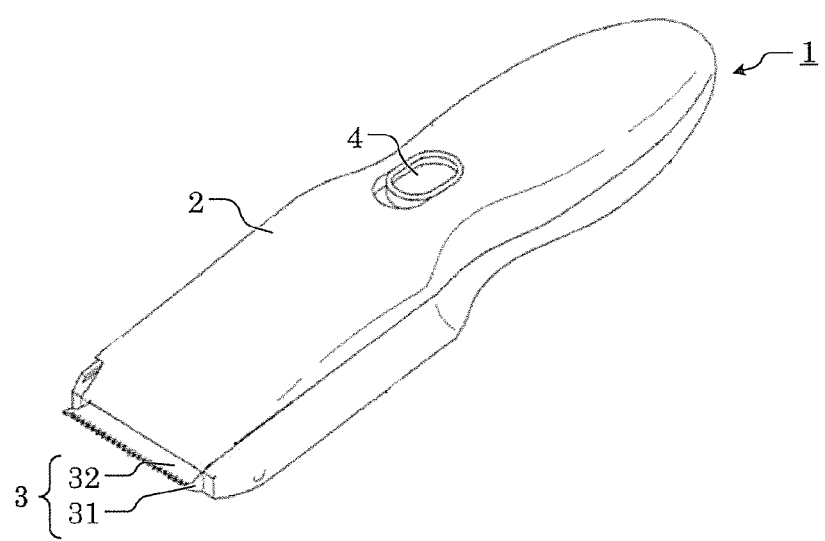
FIG. 1 is a perspective view of an appearance of a cutting device which includes an oscillatory linear actuator according to an embodiment and removes body hair.

FIG. 1 is a perspective view of an appearance of a cutting device which includes an oscillatory linear actuator according to the embodiment and removes body hair.

As illustrated in FIG. 1, cutting device 1 is, for example, an electric hair clipper, and includes case 2, blade unit 3, and switch 4. Case 2 houses oscillatory linear actuator 100 (see, for example, FIG. 2) for driving blade unit 3.

Blade unit 3 is attached to the top part of case 2. Blade unit 3 has a function of cutting body hair such as head hair. Specifically, blade unit 3 includes stationary blade 31 and movable blade 32. Stationary blade 31 is fixed to the top part of case 2. Movable blade 32 is connected to shaft 520 (see, for example, FIG. 2) of output movable element 101 of oscillatory linear actuator 100, and is part of output movable element 101 to be described later. Moreover, stationary blade 31 and movable blade 32 are in contact with each other at their opposing faces. Movable blade 32 is reciprocated relative to stationary blade 31 by oscillatory linear actuator 100. This reciprocation causes blade unit 3 to cut hair.

[Oscillatory Linear Actuator]

Next, oscillatory linear actuator 100 will be described in details.

Figure 2:
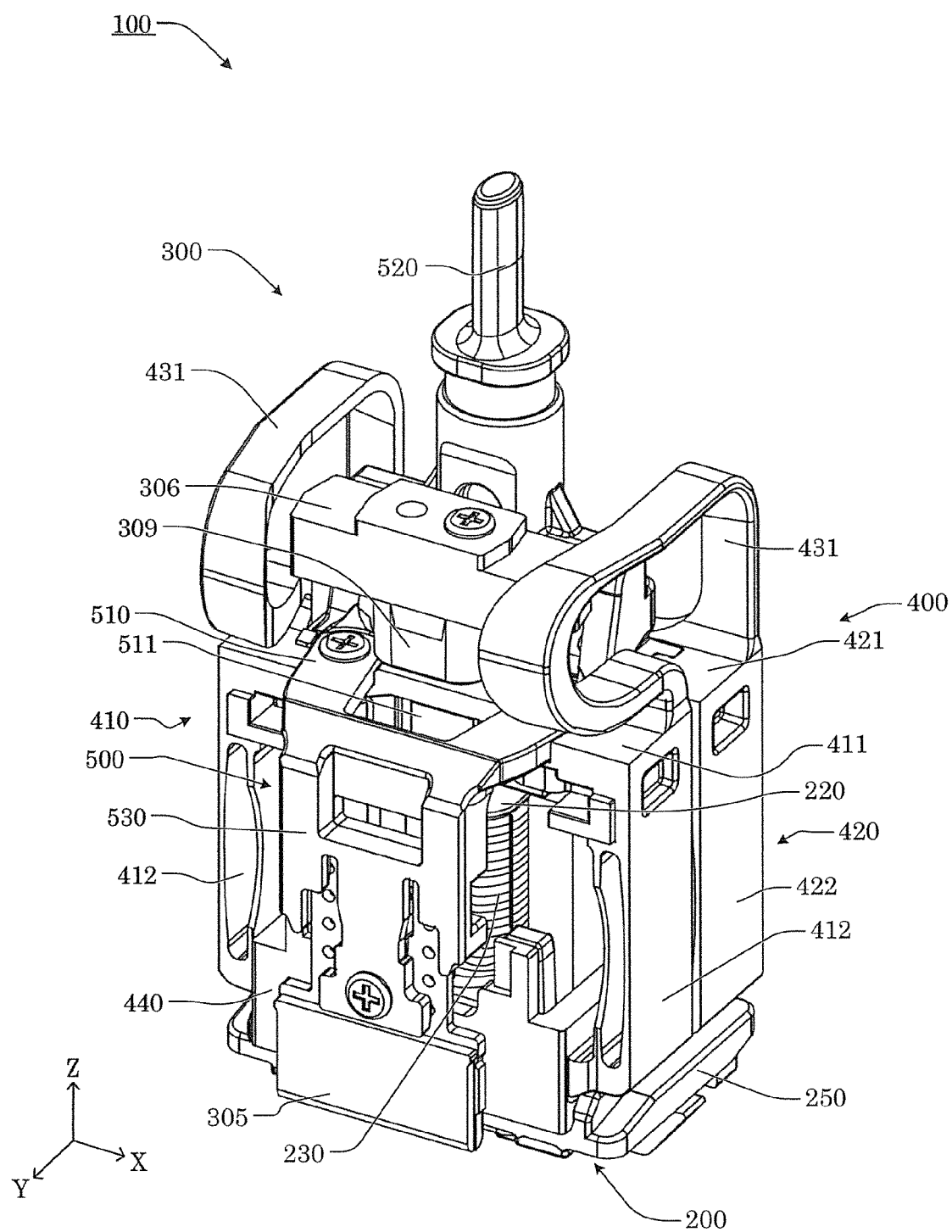
FIG. 2 is a perspective view of a schematic configuration of the oscillatory linear actuator according to the embodiment.

FIG. 2 is a perspective view of a schematic configuration of the oscillatory linear actuator according to the embodiment.

Figure 3:
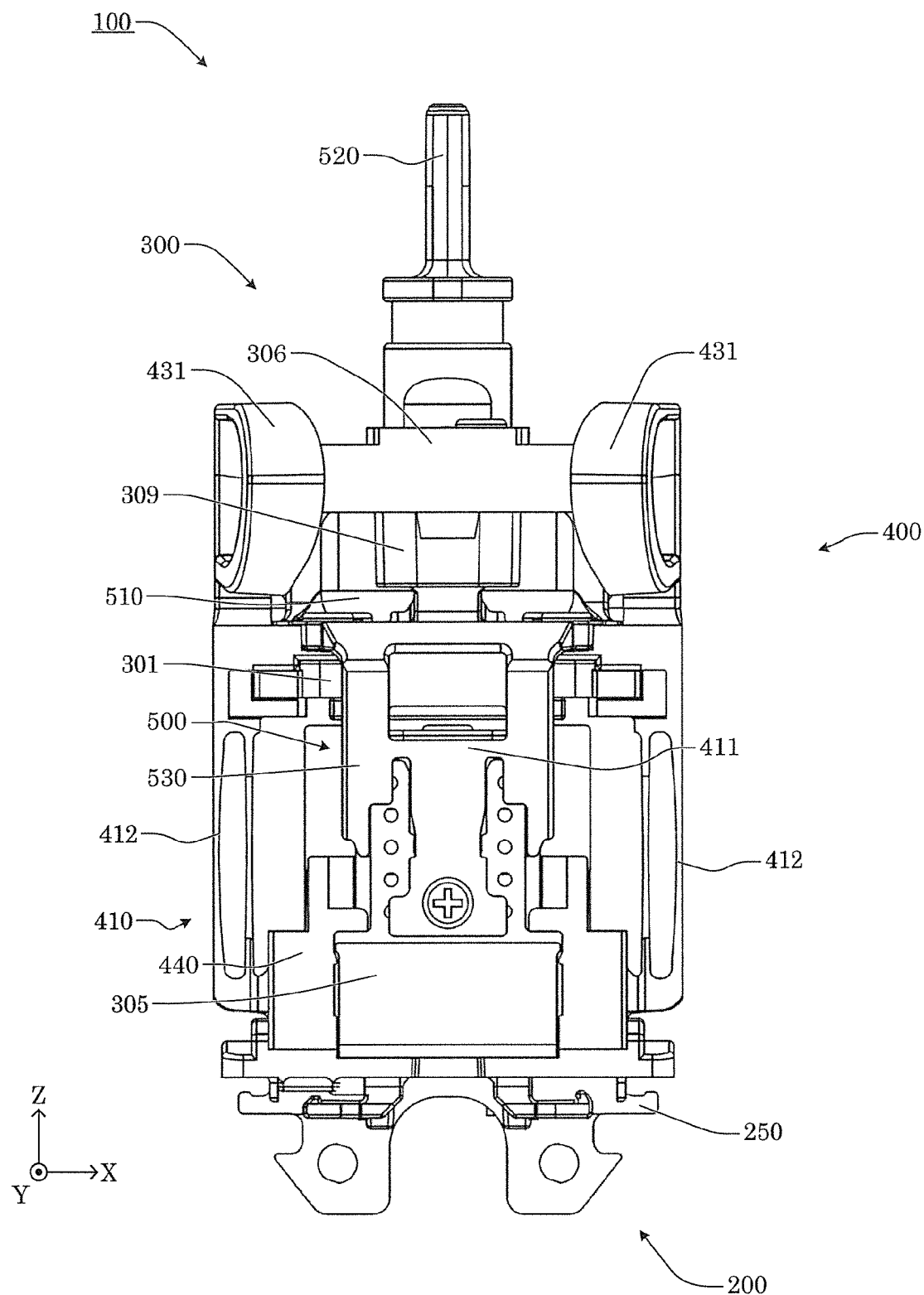
FIG. 3 is a front view of a schematic configuration of the oscillatory linear actuator according to the embodiment.

FIG. 3 is a front view of a schematic configuration of the oscillatory linear actuator according to the embodiment.

Figure 4:
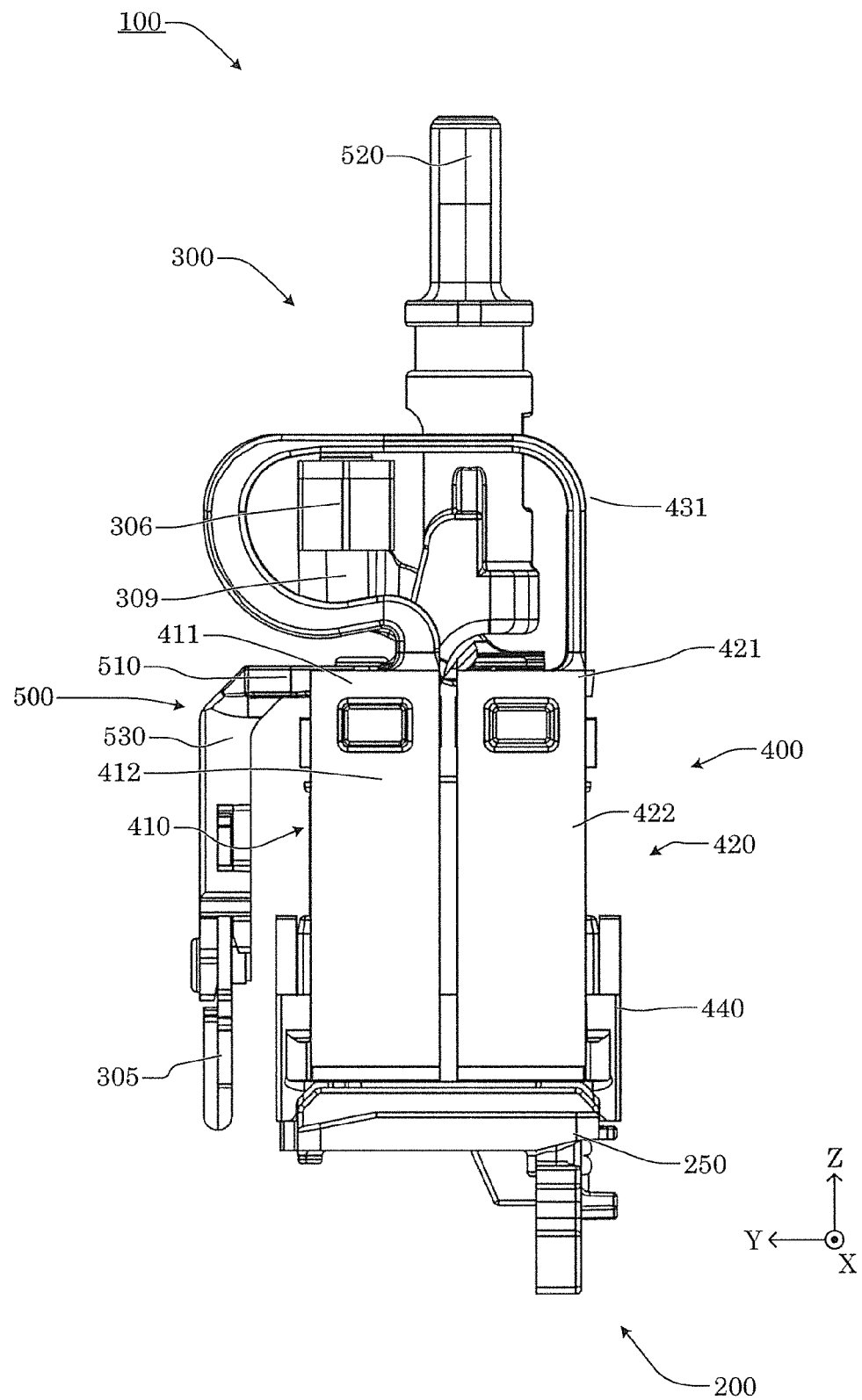
FIG. 4 is a side view of a schematic configuration of the oscillatory linear actuator according to the embodiment.

FIG. 4 is a side view of a schematic configuration of the oscillatory linear actuator according to the embodiment.

Figure 5:
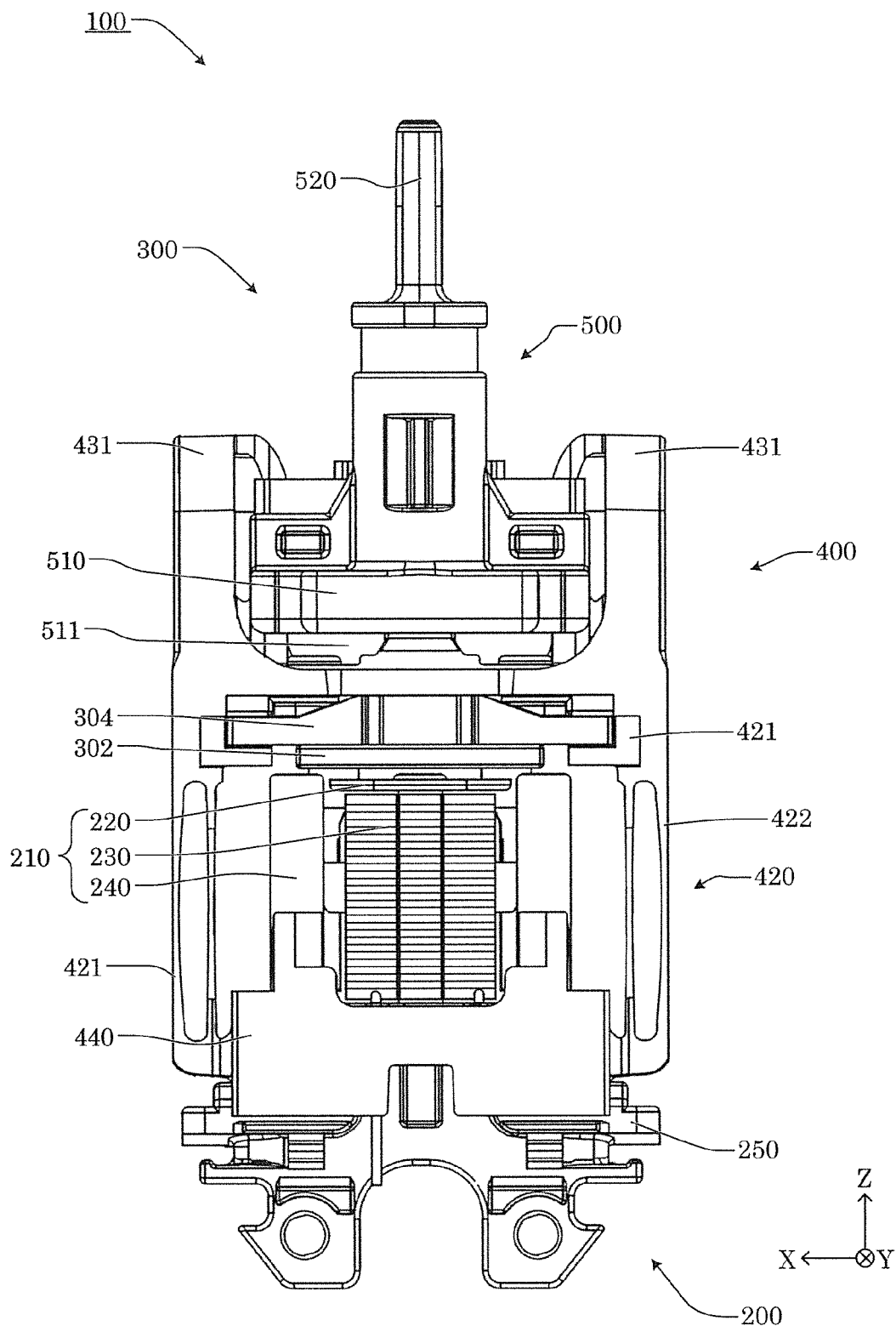
FIG. 5 is a rear view of a schematic configuration of the oscillatory linear actuator according to the embodiment.

FIG. 5 is a rear view of a schematic configuration of the oscillatory linear actuator according to the embodiment.

Figure 6:
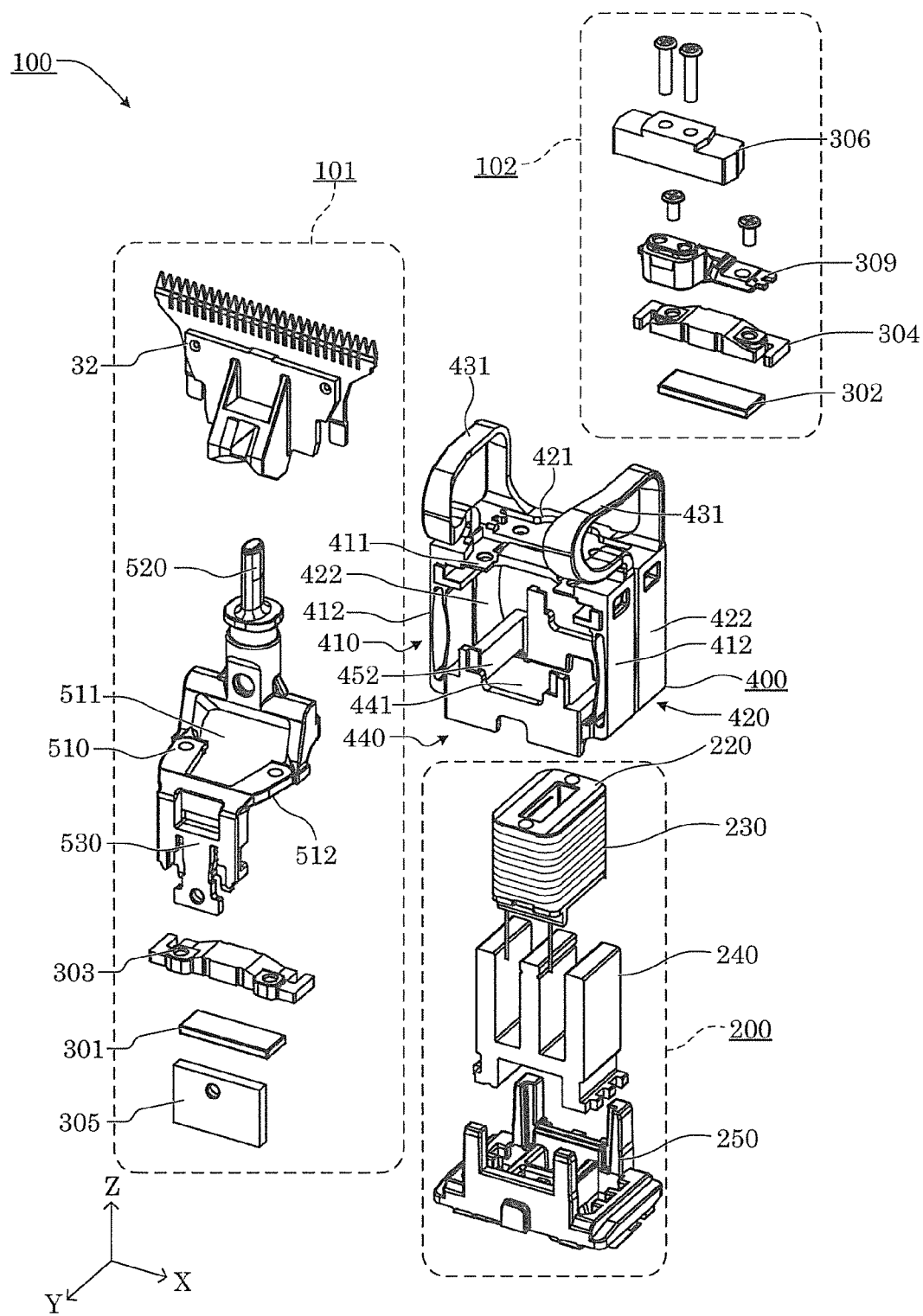
FIG. 6 is an exploded perspective view of a schematic configuration of the oscillatory linear actuator according to the embodiment.

FIG. 6 is an exploded perspective view of a schematic configuration of the oscillatory linear actuator according to the embodiment.

Figure 7:
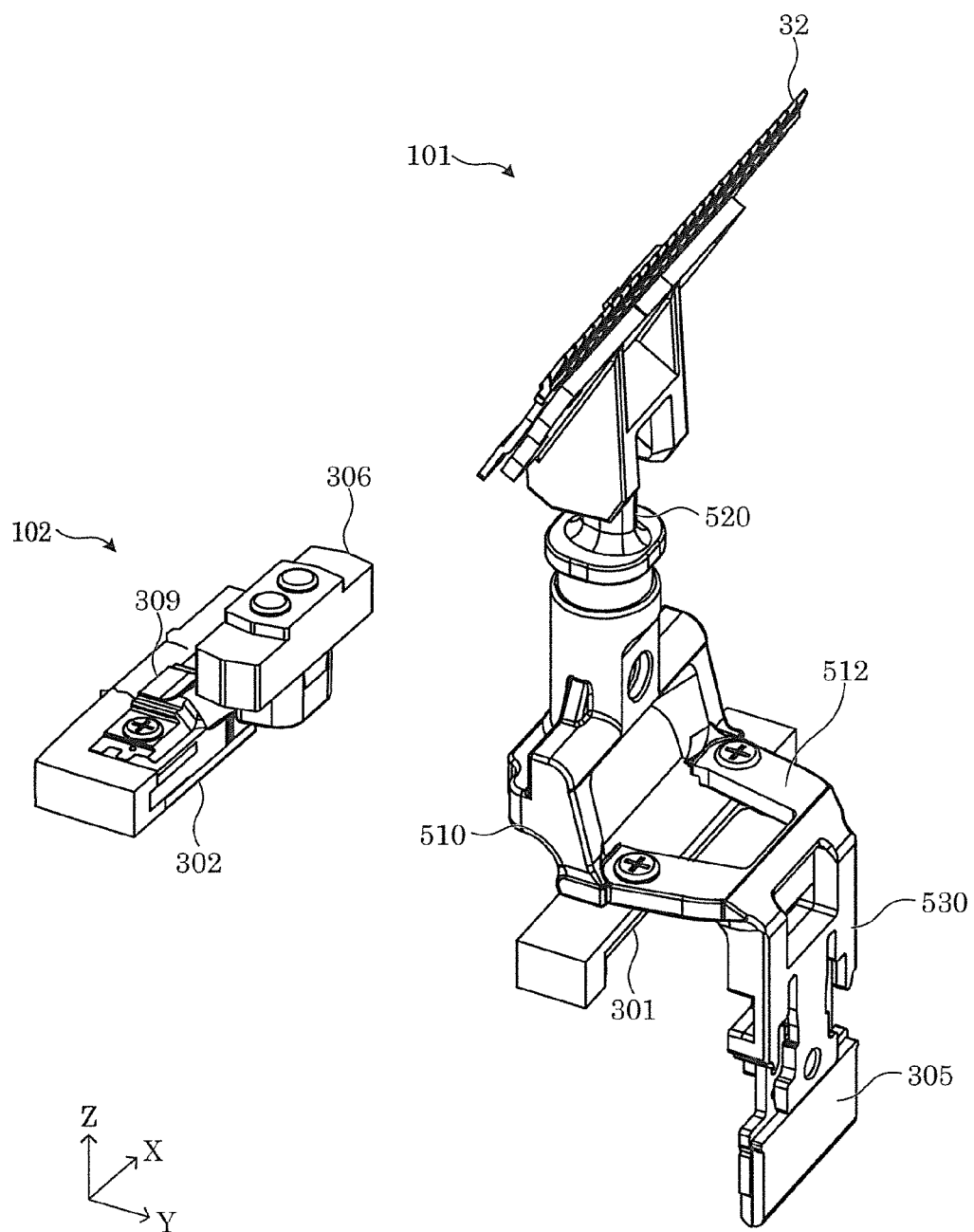
FIG. 7 is a perspective view of a schematic configuration of each of an output movable element and a vibration absorbing movable element according to the embodiment.

FIG. 7 is a perspective view of a schematic configuration of each of the output movable element and the vibration absorbing movable element according to the embodiment.

Note that, in the drawings, respective structural elements are illustrated in a three-dimensional orthogonal coordinate system where the x-axis direction indicates the direction in which the output movable element and the vibration absorbing movable element oscillate, the y-axis direction indicates the direction in which movable blade 32 and stationary blade 31 are arranged, and the z-axis direction indicates the direction in which the shaft of the output movable element extends. Note that the z-axis direction does not necessarily indicate the vertical direction depending on the state of use. However, for illustrative purposes, descriptions may be given below assuming that the x-y plane is the horizontal plane, and the z-axis direction indicates the vertical direction.

As illustrated in the drawings (in particular, FIG. 6 and FIG. 7), oscillatory linear actuator 100 includes output movable element 101, vibration absorbing movable element 102, electromagnetic core block 200, and frame 400.

[Output Movable Element]

Output movable element 101 is reciprocated by a periodically varying magnetic field, and performs work on an object such as body hair. In the present embodiment, output movable element 101 includes movable blade 32, body 510, first magnet 301, first yoke 303, and first weight 305.

Body 510 is a structural component which forms the framework of output movable element 101. Body 510 is attached to frame 400. Body 510 is cranked in an overall view. Body 510 includes: attachment part 512 which is disposed on the x-y plane; shaft 520 which is disposed on one end of attachment part 512 along the y-axis and which extends to movable blade 32 along the z-axis; and weight support 530 which extends in the opposite direction to shaft 520 from the other end of attachment part 512 along the z-axis, and which holds first weight 305.

The tip of shaft 520 has an approximately cylinder (elliptic cylinder) shape to which movable blade 32 is attached.

Weight support 530 holds first weight 305 at a position apart from attachment part 512 in order to keep movable blade 32 balanced against attachment part 512.

First magnet 301 is a permanent magnet which is attached below attachment part 512. First magnet 301 has a north pole at one end and a south pole at the other end along the x-axis. First magnet 301 is reciprocated along the x-axis by the work of the periodically varying magnetic field generated from electromagnetic core block 200, and generates a thrust force which reciprocates movable blade 32.

First yoke 303 is made of a magnetic material which concentrates the magnetic flux of first magnet 301 and increases the work with the magnetic field generated from electromagnetic core block 200.

First weight 305 is disposed opposite to movable blade 32 relative to first magnet 301, and adjusts the position of the center of mass of output movable element 101.

[Vibration Absorbing Movable Element]

Vibration absorbing movable element 102 is reciprocated at a phase opposite to the phase of output movable element 101, and reduces the overall vibration of oscillatory linear actuator 100. In the present embodiment, vibration absorbing movable element 102 includes connector 309, second magnet 302, second yoke 304, and second weight 306.

Connector 309 is a structural component which forms the framework of vibration absorbing movable element 102, and is attached to frame 400.

Second magnet 302 is a permanent magnet which is attached below connector 309. Second magnet 302 has a south pole at one end and a north pole at the other end along the x-axis. The polarities of second magnet 302 are disposed so as to be opposite to the polarities of first magnet 301. For example, along the x-axis, when the negative end of first magnet 301 is a north pole, and the positive end of first magnet 301 is a south pole, the negative end of second magnet 302 is a south pole and the positive end of second magnet 302 is a north pole. In a similar manner to first magnet 301, second magnet 302 is reciprocated along the x-axis at a phase opposite to the phase of first magnet 301 by the work of the periodically varying magnetic field which is generated from electromagnetic core block 200.

Second yoke 304 is made of a magnetic material which concentrates the magnetic flux of second magnet 302 and increases the work with the magnetic field generated from electromagnetic core block 200.

Second weight 306 adjusts the weight balance against output movable element 101.

Here, vibration absorbing movable element 102 is lighter in weight than output movable element 101. In other words, in the present embodiment, the total weight of connector 309, second magnet 302, second yoke 304, second weight 306, and components which reciprocate integrally such as fastening components (except for a portion of frame 400) is less than the total weight of body 510, first magnet 301, first yoke 303, first weight 305, movable blade 32, and components which reciprocate integrally such as fastening components (except for a portion of frame 400).

[Electromagnetic Core Block]

Electromagnetic core block 200 is a device which generates a drive force which reciprocates output movable element 101 in the oscillation direction (the x-axis direction in the drawings), and includes coil bobbin 220, coil 230, core 240, and base 250. In the present embodiment, electromagnetic core block 200 also reciprocates vibration absorbing movable element 102.

Coil 230 is a component around which electrically conductive wire is spirally wound, and is capable of generating a magnetic field when an electric current is applied to the wire. The polarities of the magnetic field generated by an application of an alternating current to coil 230 can be periodically and repeatedly reversed, which allows output movable element 101 and vibration absorbing movable element 102 to reciprocate.

Coil bobbin 220 is a component which severs as a base for forming a coil by winding electrically conductive wire around coil bobbin 220. In the present embodiment, coil bobbin 220 is made of an insulating material and has a square tube shape.

Core 240 is made of a magnetic material, and guides the magnetic field generated within coil 230 to a predetermined position. In the present embodiment, core 240 is a component having an E-shape in a side view, and integrally includes a pillar which pierces coil bobbin 220, two pillars disposed on the both sides of coil bobbin 220, and a base part which connects these pillars at the lower end of core 240. Note that the shape of core 240 is not limited to the E-shape, but may be any other shapes such as a U-shape.

Base 250 is, for example, made of an insulating material, and supports core 240 and coil bobbin 220 via core 240. Base 250 holds core 240, coil bobbin 220, and coil 230 at predetermined positions relative to frame 400.

[Frame]

Frame 400 holds output movable element 101 and vibration absorbing movable element 102 while permitting reciprocation of output movable element 101 and vibration absorbing movable element 102. Moreover, frame 400 maintains spaces between output movable element 101, vibration absorbing movable element 102, and electromagnetic core block 200. In the present embodiment, frame 400 is integrally made of resin, for example, and includes first holder 410 which holds output movable element 101, second holder 420 which holds vibration absorbing movable element 102, a pair of connection springs 431 and 432 which connect first holder 410 and second holder 420, and third holder 440 which holds electromagnetic core block 200.

First holder 410 includes first fixing part 411 elongated along the x-axis, and a pair of first springs 412 suspended from the both ends of first fixing part 411 and connected to third holder 440.

Output movable element 101 is attached to first fixing part 411. In the present embodiment, first magnet 301 and first yoke 303 are attached to first fixing part 411 from below in the aforementioned order, and attachment part 512 is attached to first fixing part 411 from above. Moreover, these are fastened by fastening components (for example, screws).

Second holder 420 is arranged side by side with first fixing part 411, and includes long plate-shaped second fixing part 421 which extends along the x-axis, and a pair of second springs 422 suspended from the both ends of second fixing part 421 and connected to third holder 440. Second holder 420 is adjacent to first holder 410 along the y-axis.

Vibration absorbing movable element 102 is attached to second fixing part 421. In the present embodiment, second magnet 302 and second yoke 304 are attached to second fixing part 421 from below in the aforementioned order, and connector 309 and second weight 306 are attached to second fixing part 421 from above in the aforementioned order.

A pair of connection springs 431 are flat plate springs which are curved and connects first holder 410 and second holder 420 so as to be freely oscillate. Specifically, among the pair of connection springs 431, one of connection springs 431 connects one end of first fixing part 411 of first holder 410 and one end of second fixing part 421 of second holder 420. Moreover, the other one of connection springs 431 connects the other end of first fixing part 411 of first holder 410 and the other end of second fixing part 421 of second holder 420.

Moreover, connection springs 431 have such a structure that, along the x-axis, the amplitude of vibration absorbing movable element 102 is permitted to be greater than the amplitude of output movable element 101, that is, the amplitude of second fixing part 421 is permitted to be greater than the amplitude of first fixing part 411.

Third holder 440 is a frame having opening 441 which is rectangular in a top view. Third holder 440 holds electromagnetic core block 200 with electromagnetic core block 200 being inserted to opening 441 of third holder 440.

Moreover, first spring 412 of first holder 410 and second spring 422 of second holder 420 are connected to third holder 440. Accordingly, first spring 412 and second spring 422 oscillate with the connected portions of third holder 440 being a point of origin.

[Operation]

Next, the operations performed by oscillatory linear actuator 100 will be described.

When an alternating current is supplied to coil 230 of electromagnetic core block 200 which forms an electromagnet, the state of the north pole, the south pole, and the north pole (in this arrangement order) and the state of the south pole, the north pole, and the south pole (in this arrangement order) are periodically switched on the top end surfaces of respective pillars of core 240.

In contrast, first magnet 301 held by first holder 410 and second magnet 302 held by second holder 420 are disposed so that the polarities of the respective magnets are reversed. Accordingly, the magnetic force generated from single coil 230 generates opposing forces along the x-axis on first magnet 301 and second magnet 302, which causes first magnet 301 and second magnet 302 to linearly move in the opposite directions. As a result, output movable element 101 and vibration absorbing movable element 102 oscillate at the opposite phases.

Advantageous Effects, Etc

As described above, in oscillatory linear actuator 100 included in cutting device 1 according to the present embodiment, vibration absorbing movable element 102 is set to be lighter in weight than output movable element 101. Accordingly, the thrust force generated by oscillatory linear actuator 100 is not reduced by vibration absorbing movable element 102 which does not contribute to cutting of an object such as body hair. This allows the thrust force to be used efficiently for cutting the object. Therefore, the thrust force of oscillatory linear actuator 100 can be efficiently assigned to output movable element 101, which allows the object to be cut with power.

Note that the present disclosure is not limited to the above embodiment. For example, other embodiments that can be realized by arbitrarily combining the structural elements described in the present specification or by removing some structural elements may be embodiments of the present disclosure. Moreover, modifications obtainable through various changes to the above-described embodiment that can be conceived by a person of ordinary skill in the art without departing from the essence of the present disclosure, that is, the meaning of the recitations in the claims are included in the present disclosure.

For example, the shape and the structure of output movable element 101 are not limited to the above embodiment. For example, in the case where electromagnetic core block 200 includes a permanent magnet, an electromagnet may be provided in output movable element 101.

Moreover, output movable element 101 may include a plurality of work parts such as a plurality of movable blades 32. Moreover, even if output movable element 101 is divided into a plurality of elements, if those elements oscillate together at the same phase and generate a thrust force acting on an object, they are considered to be output movable element 101. Moreover, it may be that the weight distribution of divided output movable elements 101 does not need to be equal. It is acceptable if the overall weight of output movable elements 101 is greater than the overall weight of vibration absorbing movable element 102.

Moreover, in a similar manner to output movable element 101, the shape and the structure of vibration absorbing movable element 102 are not limited to the above embodiment. Vibration absorbing movable element 102 may include an electromagnet.

Moreover, output movable element 101 may include a plurality of work parts such as a plurality of movable blades 32. Moreover, even if output movable element 101 is divided into a plurality of elements, if those elements oscillate together at the same phase and generate a thrust force acting on an object, they are considered to be output movable element 101. Moreover, vibration absorbing movable element 102 may be divided into a plurality of elements as long as the divided elements oscillate at the phase opposite to the phase of output movable element 101.

Moreover, it has been described that vibration absorbing movable element 102 oscillates due to interaction with electromagnet core block 200. However, it may be that vibration absorbing movable element 102 does not work with the magnetic force generated from electromagnetic core block 200, but functions as a dynamic vibration absorber connected to output movable element 101 with an elastic member. In this case, vibration absorbing movable element 102 does not need to include a permanent magnet and an electromagnet.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to a cutting device which removes body hair such as an electric clipper and an electric razor, and a cutting device which cuts grass and tree branches.

What is claimed is:

1. An oscillatory linear actuator comprising:
    an output movable element which is reciprocated by a periodically varying magnetic field and performs work on an object;
    a vibration absorbing movable element which is reciprocated at a phase opposite to a phase of the output movable element and reduces vibration of the oscillatory linear actuator;
    a first holder that holds the output movable element and that is reciprocated together with the output movable element;
    a second holder that holds the vibration absorbing movable element and that is reciprocated together with the vibration absorbing movable element; and
    an elastic connector connecting the first holder and the second holder, the elastic connector being configured to, along a first axis, allow amplitude of reciprocating the vibration absorbing movable element held by the second holder to be greater than amplitude of reciprocating the output movable element held by the first holder,
    wherein the vibration absorbing movable element is lighter in weight than the output movable element,
    wherein the output movable element comprises:
        a body including an attachment part held by the first holder, wherein the attachment part extends in an x-y plane;
        a shaft extending from a portion of the body in a first direction along a third axis perpendicular to a first axis and a second axis, wherein a distal end of the shaft is adapted to support an attachment that is driven by the oscillatory linear actuator; and
        a weight support extending from the attachment part in a second direction, opposite the first direction, along the third axis, wherein the weight support extends to a side face of a coil of an electromagnet disposed underneath the first and second holders, and wherein a distal end of the weight support holds a first weight to maintain balance of the attachment against the attachment part.

2. The oscillatory linear actuator according to claim 1, wherein the vibration absorbing movable element includes a second weight for weight adjustment.

3. The oscillatory linear actuator according to claim 1, wherein the output movable element includes a permanent magnet, and the vibration absorbing movable element includes a permanent magnet, and
    wherein the permanent magnets of the output movable element and the vibration absorbing movable element are reciprocated by a single fixed electromagnet.

4. A cutting device comprising:
    an oscillatory linear actuator according to claim 1;
    a movable blade that is the attachment of the output movable element; and
    a stationary blade which rubs against the movable blade.

5. The oscillatory linear actuator according to claim 1, wherein
    the elastic connector comprises a first elastic connector connecting the first holder and the second holder, and a second elastic connector connecting the first holder and the second holder,
    the first and second elastic connectors are flat plate springs, each of which is bent to have a substantially U-shaped portion and a substantially L-shaped portion when viewed from a reciprocating direction of the output movable element and the vibration absorbing movable element, a first end of the substantially U-shaped portion being connected to the first holder, a second end of the substantially U-shaped portion being connected to a first end of the substantially L-shaped portion, and a second end of the substantially L-shaped portion being connected to the second holder.

\* \* \* \* \*